Aug. 8, 1967    J. J. J. STAUNTON    3,334,956
SELECTIVE DIFFRACTION GRATING SYSTEM
Filed June 17, 1963    2 Sheets-Sheet 1
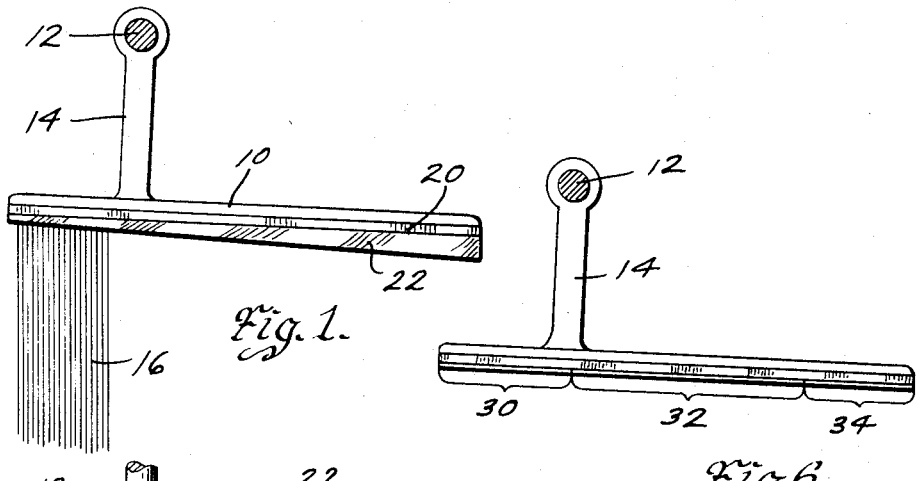
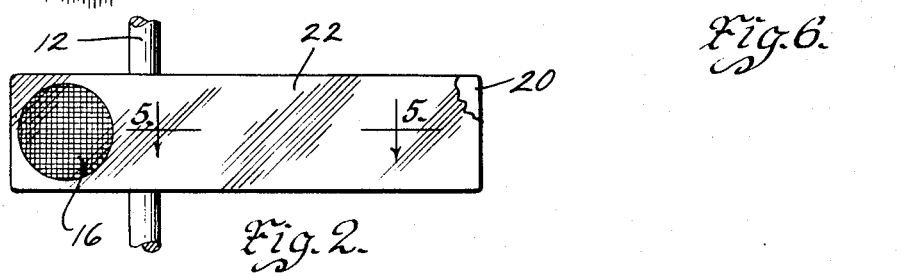
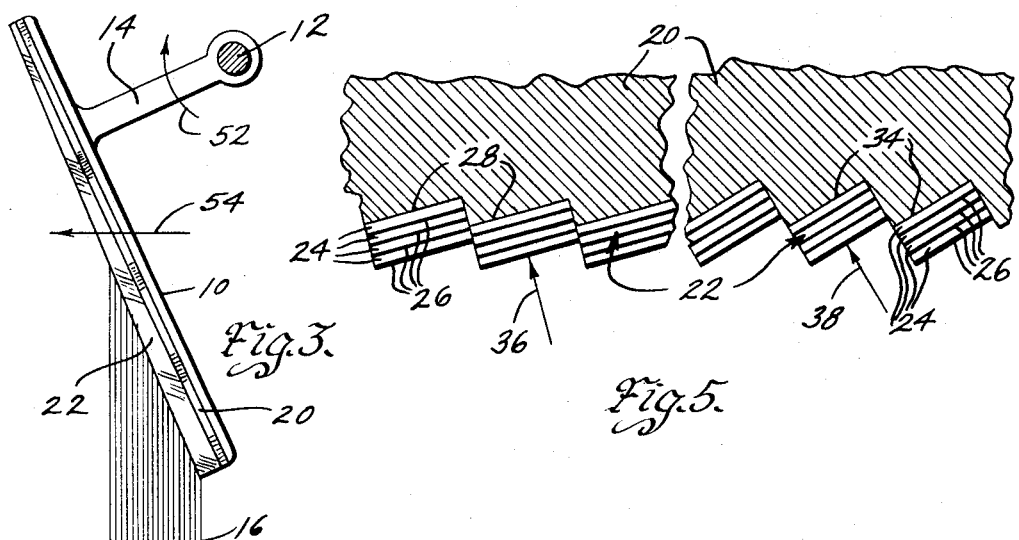
Inventor:-
John J. J. Staunton
by Bair, Freeman & Molinare
Attys.

Aug. 8, 1967     J. J. J. STAUNTON     3,334,956
SELECTIVE DIFFRACTION GRATING SYSTEM
Filed June 17, 1963     2 Sheets-Sheet 2
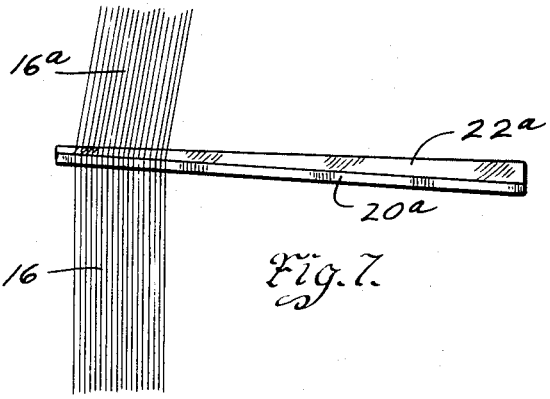
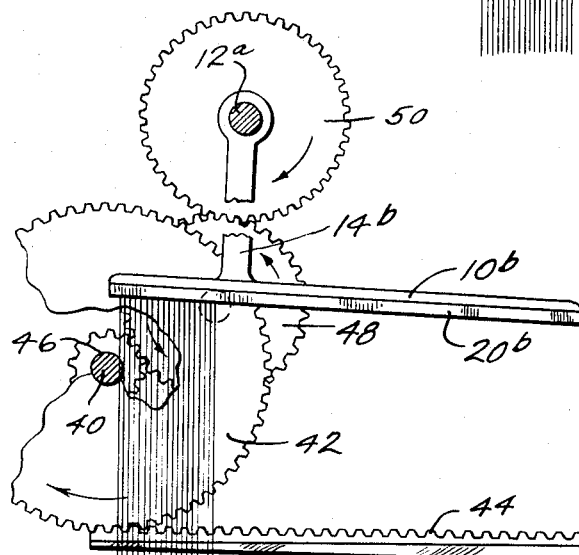
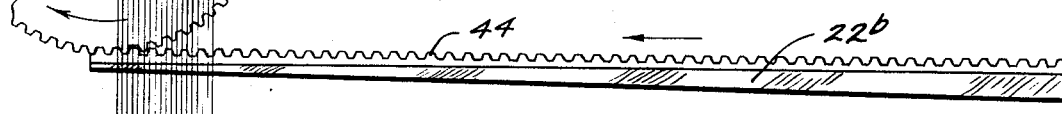
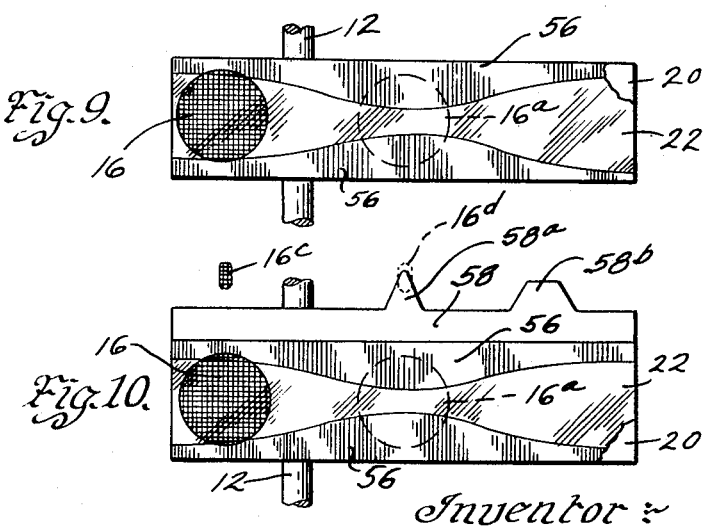
Inventor:
John J. J. Staunton
by Bair, Freeman & Molinare
Attys.

United States Patent Office 3,334,956
Patented Aug. 8, 1967

3,334,956
SELECTIVE DIFFRACTION GRATING SYSTEM
John J. J. Staunton, Oak Park, Ill., assignor, by mesne assignments, to Coleman Instruments Corporation, Maywood, Ill., a corporation of Delaware
Filed June 17, 1963, Ser. No. 288,170
13 Claims. (Cl. 350—162)

This invention relates to a selective diffraction grating system comprising the combination of a diffraction grating as a dispersion means for radiant energy and an interference wedge as an order sorter for the dispersed radiant energy.

As a dispersion means the diffraction grating has the advantage over the prism of higher dispersion, higher resolution and a substantially normal or linearly dispersed spectrum. Furthermore, modern gratings are being made comparatively free from scattered light, a defect in the older gratings which often led to use of a prism as less objectionable. However, when a grating is used in a wave length region where more than one order is present, the problem still exists of rejecting the unwanted order or orders.

This has negated using gratings in both monochromators of a double monochromator, even though such a construction would greatly reduce the problem of tracking the wave length drives of the two monochromators together and would also make the bandpass of the second monochromator the same as that of the first so that a greatly improved rejection of near scattered light would be possible. Since the second grating could not reject the unwanted spectral orders of the first, prior art has found double grating monochromators impractical unless further selective means could be supplied to give the required order sorting. Because of the complication of adding what is essentially a third monochromator, this has not heretofore been done in a very simple or effective manner.

If a simple arrangement requiring no additional optical setup, or tracking and adjusting means were available to eliminate all except one order of a grating without reducing substantially the intensity of that order, then a double grating monochromator would become a practical and highly useful device. A grating with only a single order would also be useful in a single monochromator both in spectrophotometry and in spectrography since it would eliminate the confusion due to overlapping orders.

A broad object of the present invention is to provide a novel combination of a diffraction grating as a dispersion means and an interference wedge as an order sorter which will accomplish this desirable result of producing a single grating spectrum without order overlap.

Another object of the invention is to provide a combination of diffraction grating and interference wedge in which both may be reflecting type, both may be transmission type or one may be reflection type and the other transmission type to accomplish the desirable results referred to.

Still another object is to provide a combination of diffraction grating and order sorter in which the order sorter has graduated reflectance rather than being in the nature of an interference wedge.

A further object is to provide an interference wedge combined with a diffraction grating which can be effectively used when a second or higher order only is desired from the grating by proper design of the wedge and the grating and their location in the proper relative position.

Another object is to provide a light dispersing device mounted so as to rotate and translate with respect to the light beam to provide wave length selection.

With these and other objects in view, my invention consists in the construction, arrangement and combination of the various parts of my selective diffraction grating system, whereby the objects above contemplated are attained, as hereinafter more fully set forth, pointed out in my claims and illustrated in detail on the accompanying drawing, wherein:

FIG. 1 is a diagrammatic plan view of the combination of a diffraction grating and an interference wedge embodying my invention, a beam of light being shown incident on the wedge and grating;

FIG. 2 is a front elevation of FIG. 1;

FIG. 3 is a plan view similar to FIG. 1 showing the grating and wedge rotated and translated for impingement of the light beam on a different section thereof;

FIG. 4 is a front elevation of FIG. 3;

FIG. 5 is a greatly enlarged horizontal sectional view on the line 5—5 of FIG. 2 showing one embodiment of my invention wherein an interference wedge is deposited on a bipartite diffraction grating;

FIG. 6 is a diagrammatic plan view of a modification wherein a reflecting coating on the grating is provided instead of an interference wedge, such coating having a selective graduation in reflectance with wave length;

FIG. 7 is a diagrammatic plan view showing a transmission grating combined with a transmission wedge;

FIG. 8 is a diagrammatic plan view of a construction modified in respect to FIG. 1 wherein the grating and interference wedge are separately mounted and driven at different speeds to accomplish greater resolution, means being shown for transporting the interference wedge across the light beam at a faster rate than the grating; and FIGS. 9 and 10 are views similar to FIG. 2 illustrating additional features of my invention.

On the accompanying drawing I have shown in FIG. 1 a diffraction grating 20 and an interference wedge 22. These are shown merely diagrammatically rather than illustrating their details. Both are of the reflecting type and the grating may be conventional, having the same characteristics over its whole length, or may advantageously be of the type shown in my Patent No. 3,045,532 which has a wide useable range in wave lengths. On the other hand, it may be a bipartite or otherwise graduated grating having a high ultraviolet efficiency at one end and a high infrared efficiency at the other end.

An interference wedge, described in a simple manner, consists of a glass backing plate on which is deposited by evaporation or sputtering a thin coat of semitransparent metal (half mirror) which will transmit part of a light of a given wave length and reflect part. On this film of metal is then deposited a transparent spacer layer one-half wave length thick followed by another thin metal coat. Light penetrating the latter coat and the spacer, and then reflected from the first coat, will be re-reflected in part from the latter coat and will rejoin the unreflected beam passing through the first coat in phase, i.e., retarded one wave length, reinforcing the unreflected beam. Such a coated plate acts as a simple interference filter that tends to pass light of this wave length but not light of other wave lengths. If the spacer layer is so deposited that its thickness changes progressively across the backing plate, an interference wedge is the result whose color or transmitted wave length will change progressively from one edge of the plate to the other. Such a wedge provides constructive interference for the desired wave lengths and destructive interference for the remaining wave lengths.

The above description is simplified. A simple filter or wedge of this type would actually be unusable for my purpose because it is not suitable for use as a reflection filter, and as a transmission filter it passes other wave lengths or orders, in substantially the same fashion as the grating.

Hence it would not suppress the grating's higher orders. However, modern art is not restricted to three-layer coatings but may use twenty or thirty layers of materials, metallic or non-metallic, of various indices of refraction and precisely spaced to give selective transmitting or reflecting coatings of a wide variety of predetermined characteristics. These, unlike the three-layer filters, can be made as narrow or broad band reflecting filters or wedges with a sharp cutoff on the short wave length and/or long wave length end and without the presence of multiple orders or pass bands. Interference wedges are now possible covering from the ultraviolet at 200 millimicrons or less at one end to the infrared at 5 or 10 microns at the other, the limits increasing continually with the state of the art.

FIG. 1 shows the diffraction grating 20 mounted on a bracket 10 to rotate with a wave length drive shaft 12. An offset arm 14 connects the bracket 10 to the shaft 12. The grating 20 is a reflection grating which has deposited on it the reflecting interference wedge 22 having a high reflectance for the ultraviolet at the left hand end graduating to a high reflectance for the infrared at the right hand end. To do this without vitiating the grating action, the source of the material being deposited is located with respect to the grating so that the travel of the molecular beam is perpendicular to the working side of the grating grooves as indicated by the arrows 36 and 38 in FIG. 5, for instance. By this means the whole groove face will be coated evenly without being shadowed by the adjacent non-working groove face, and scattering in the optical spectrum will be minimized. An evaporated layer as thick as 80 times the groove depth can be built up in this way without changing or modifying the groove shape significantly. The graduation of layer thickness to produce the interference wedge may be effected by moving a variable slit or diaphragm across the face of the grating, or by moving the grating past an edge of a barrier in any of the ways known to those skilled in the art.

The grating 20 may be a conventional grating having the same characteristics over its whole length but I prefer that it be a bipartite or otherwise graduated grating having a high ultraviolet efficiency at the ultraviolet end and a high infrared efficiency at the infrared end; these efficiencies being a function of the blaze or groove shape as independent of the reflecting coating. FIG. 5 shows a bipartite grating wherein the grooves 28 at the ultraviolet end are at one angle while the grooves 34 at the infrared end are at a greater angle. This figure also illustrates multiple layers deposited on the diffraction grating 20 to constitute the interference wedge 22. Merely by way of example, four transparent layers 24 of one-half wave length thickness are shown (as white areas) and four coatings 26 are shown (as heavy black lines) which coatings may be of evaporated or sputtered metal or other medium as hereinbefore referred to. By sputtering or depositing in the direction of the arrows 36 and 38 respectively, the groove pattern of the grating is retained. The design of the interference wedge is such that constructive interference for the desired wave lengths and destructive interference for the remaining wave lengths is had.

The grating 20 is shown in position in FIG. 1 to return a beam of light 16 from the collimator of a Littrow monochromator as an ultraviolet beam. The grating is at a small angle to beam 16, for example about 3.5° at 200 m$\mu$ for a 600 line/mm. grating. In FIG. 3 the grating has been swung by rotating the wave length drive shaft 12 to a position to return infrared from the beam 16. The angle of the grating might then be about 64° at 3 microns. Because of the novel offset mounting design as shown, the grating in swinging also moves transversely with respect to the beam 16 so that this beam has proceeded from the ultraviolet part of the grating to the infrared part and at the same time from the ultraviolet part of the interference wedge coating to the infrared part. The movement to the infrared part of the grating makes available the high infrared blaze efficiency as needed but this will not in itself suppress any higher orders that may also be reflected; e.g. 1.5 m$\mu$ in order 2, 1.0 m$\mu$ in order 3, 0.75 m$\mu$ in order 4, etc. These higher orders will also be enhanced by the high blaze efficiency of the grating in the infrared position. However, the beam is now being reflected from the region of the interference wedge which has a high reflectance for 3.0 m$\mu$ but not for 1.5 m$\mu$ or any of the higher orders, hence the latter will be suppressed. The mounting disclosed which results in combined rotation and transverse translation is also useful for diffraction gratings that do not have an interference wedge combined therewith as it secures the desired change in angle of the grating to the beam for maximum efficiency of operation of the grating.

It will be apparent that this same effect can be secured if the reflecting coating on the grating 20 has a selective graduation in spectral reflectance with wave length for other reasons than that of being an interference wedge. For instance (see FIG. 6), coating 30 of high ultraviolet reflectance such as aluminum may be deposited on the ultraviolet end of the grating, which gives way to a coating 32 of gold or the like on the midportion (visible region) of the grating which absorbs ultraviolet, and then to a simple or multilayer infrared reflecting coating 34 such as germanium over gold at the infrared end. Or over a non-selective coating, a graduated absorbent coating such as germanium may be applied in the infrared region, which will pass freely in the wave length region of the desired order but will absorb in the regions of the undesired orders, thereby acting as a filter to reject light of one predetermined range of wave lengths in one area thereof and reject light of another predetermined range of wave lengths in another area thereof. In any of these modifications the effect of the graduated coating is to act as an order-sorter, suppressing the unwanted orders. The selection of which type of graduated coating is used is a matter of effectiveness, practicality and economy as will be determined by the manufacturer to meet specific requirements for the individual instrument being fabricated.

Although I have disclosed above a particular embodiment using a reflection grating, the same principle is readily extended to a transmission grating 20$^a$ as shown in FIG. 7 using a transmission interference wedge 22$^a$ or its equivalent from the standpoint of graduated transmission across the length of the grating. The incident collimated beam 16 is transmitted as beam 16$^a$ after dispersion by the grating and the wedge. It should be noted that the grating mounting of FIGS. 1 to 4 is but one means preferred because of simplicity for effecting the novel teaching of translating the effective aperture of a grating or of a multiprism (such as shown in my copending application, Ser. No. 113,469, filed May 29, 1961, now Patent 3,254,556) so as to take advantage of a characteristic of the device which is variable with change in wave length. In addition to the characteristic of efficiency above outlined as being due to a selective coating, another cooperating variable characteristic which may be affected by this mounting method is variable aperture. This characteristic which may be controlled by masking a variable proportion of the height of the grating at different positions along its length is used to level out variations of intensity of the light beam or of response of the photometer as the wave length changes. Such variations may be due to the source, to the sensitivity of the photometer, to the change in efficiency of the gating modified by any selective coatings that it may carry as outlined herein or to the combination of all three. Furthermore, if the variations are too great to be taken care of by masking of the grating or if the changes are too rapid from wave length to wave length so that sufficient resolution cannot be had, an auxiliary mask can be used.

FIG. 9 shows a mask 56 applied as a non-reflecting coating or cover over the surface of the grating 20. At the ultraviolet end (left hand end) response of the photometer is assumed to be low and hence the optical beam 16 is only slightly intercepted by the mask. At a higher wave length, for instance, when the beam is at 16a response would be too high but for the fact that the mask now intercepts a greater proportion of the beam. It will be apparent that this system is only able to smooth out slowly occurring changes in response with wave length because the width of the beam limits the resolution available.

If the grating is used in an optical system of the type where a narrower region of the optical beam passes by an adjacent edge of the grating as shown at 16c as in FIG. 10 before being reflected to the grating 20, then greater resolution and augmented range of intensity or response control may be had by using an auxiliary mask 58 fixed to the grating. The manner in which this intercepts the extension of the optical beam at 16d (when the beam falling on the grating is at 16a to give a local reduction in response at that wave length) is accomplished by a suitably shaped projection such as 58a or 58b from the mask 58. The simple systems for controlling variations of response with wave length shown in FIGS. 9 and 10 cooperate with and are made possible by the novel method of mounting and moving a grating as disclosed in FIGS. 1 to 4.

Heretofore the problems of overlapping orders have generally been less when the first order is the desired order. Users of gratings have been able to use a series of auxiliary filters having a low transmission at shorter wave lengths by moving these into the beam successively as required as the wave length is scanned. However, if a higher order is the order of interest, as may be the case in an infrared monochromator or spectograph, then the filter problem becomes even more difficult to solve by prior art methods. A further feature of my invention resides in the combination of grating and interference wedge being effective when the second or a higher order only is desired from the grating, it being only necessary to design the wedge and the grating appropriately and locate them in the proper relative position.

While I have shown in FIGS. 1, 2, 3 and 4 the combination of a reflecting grating and a reflecting interference wedge, and in FIG. 7 the combination of a transmission grating and a transmission interference wedge, these combinations may be varied depending upon the optical arrangements in monochromators to which my invention is applied. Various combinations of reflection gratings and transmission wedges as well as reflecting wedges and transmission gratings are also possible.

Since the bandpass of an interference wedge is a function of the width of the beam where it impinges on the wedge, the transmitted or reflected wave length being a function of length along the wedge, there may arise occasions where the requirement of order separation may unduly restrict the permissible beam width. Since resolution, or ability to separate closely adjacent wave lengths of the grating, is a direct function of the length of the grating spanned by the beam, restriction to a narrow beam width may cut the resolution to too low a figure. It is a further embodiment of my invention that the wedge may be made separated from the grating and mounted separately, either as a transmission wedge in front of a reflection grating or as a reflection wedge behind a transmission grating, so that the wedge may be traversed across the beam at a faster rate than the beam traverses the grating, thus permitting a wider beam and higher resolution while still effecting proper order separation. This is illustrated in FIG. 8 where the wedge 22b is approximately twice the width of the grating 20a and is moved at approximately twice the rate across the beam, thus permitting a beam of about twice the width with correspondingly improved resolution.

By way of example, a secondary wave length drive shaft 40 may rotate a gear 42 meshing with a rack 44 that transports the interference wedge 22a while a pinion 46 on the shaft 40 meshes through an idler gear 48 with a gear 50 on the primary wave length drive shaft 12a for the grating 20b, the ratio of drive being such that one revolution of the shaft 40 transports the interference wedge its full length while the grating is being moved from an angle such as illustrated to the angle for the infrared end of the grating such as illustrated in FIG. 3.

A further advantage of the arrangement just described is that the wedge is always perpendicular to the light beam so that the wedge bandpass is more sharply defined. With this arrangement, however, the bandpass does not increase in the infrared, as would tend to occur in FIG. 3 due to both the obliquity and the elongation of the intersection of the beam and the wedge. Such an increase is desirable because the orders are more separated in the infrared. To recover this advantage it would be possible to use in FIG. 8 a non-linear wedge where the rate of change of wave length with distance increases toward the ultraviolet end so as to give the reduction in bandpass desirable for effective order-sorting in the ultraviolet while maintaining the high resolution so essential in the ultraviolet. Of course, the rate of traverse of the wedge would have to be non-linear to match its wave length characteristics. This may readily be accomplished by the use of suitably designed cams in a cam-lever-linkage combination such as used in the monochromator art. It is obvious that, where it is adequate, the simplicity of the one piece embodiment of FIG. 1 is preferable.

In further extension of the above remark concerning my preferred embodiment shown in FIGS. 1 and 3, I wish to point out that the mounting of the dispersion means, here a grating, on an offset arm so that its motion with wave length change is a combination of both rotation (arrow 52 in FIG. 3) and transverse translation (arrow 54) with respect to the light beam 16 is a novel concept of my invention because of the effective way in which it implements the proper operation of the combined grating and interference wedge assembly disclosed. It is an efficient means of mounting and using a bipartite grating or any other grating which has graduated efficiency along its length, or more generally any linearly graduated dispersion means (such, for instance, as a multiprism of the type disclosed in my copending application, hereinbefore referred to), as well as the grating-wedge combination herein disclosed.

From the foregoing specification it will be apparent to one skilled in the art, that the addition of an interference wedge as a second monochromator in a double monochromator has considerable merit, though it is more complex and does not have the near scattered light rejection of the two grating monochromator previously mentioned. There is also merit in using the wedge as a third monochromator to a double grating monochromator at the cost of added complexity. The terms "second" and "third" here have the usual meaning, not of order but of function, where the primary dispersion system is the first monochromator, the stray light dispersion system is the second, and the order-sorter is the third unless the latter two are combined. These variations have a definite relationship to the subject of this invention and can readily be substituted for the preferred embodiment.

Some changes may be made in the construction and arrangement of the parts of my selective diffraction grating system without departing from the real spirit and purpose of my invention. It is my intention therefore to cover by my claims any modified forms of structure or use of mechanical equivalents which may reasonably be included within their scope.

I claim as my invention:

1. A selective diffraction grating system comprising a diffraction grating having grooves with working faces to act as a dispersion means and an interference wedge to act as an order sorter, said interference wedge being integrally combined with said working faces of the diffraction grating to act in succession on an incident beam of radiant energy.

2. The structure of claim 1 in which said grating is mounted for simultaneous rotational and transverse translational movement with respect to said beam.

3. A selective diffraction grating system comprising the combination of a diffraction grating having grooves with working surfaces and an interference wedge composed of a plurality of light transmitting layers from one end to the other thereof superimposed on said working surfaces and of such construction as to provide constructive interference for the desired wave lengths and destructive interference for the remaining wave lengths.

4. A selective diffraction grating system comprising a diffraction grating having grooves with working surfaces, said surfaces having superimposed thereon a reflecting layer having different spectral reflectance in successive areas along the length of said grating.

5. A selective diffraction grating system comprising a diffraction grating having grooves with working surfaces, said surfaces having superimposed thereon a transmitting layer having different spectral transmittance in successive areas along the length of said grating.

6. In a monochromator, a beam of light, a diffraction grating having grooves with working faces, an interference wedge integrally combined with said working faces and cooperating with said beam of light to select desired wave lengths therefrom, and a mounting for said diffraction grating for supporting it in the path of said beam, said mounting being adapted to move simultaneously in rotation and in transverse translation relative to said beam.

7. A selective diffraction grating system comprising a diffraction grating having grooves with working surfaces, said surfaces having superimposed thereon a plurality of transparent layers for selectively reflecting and transmitting light of a predetermined wave length range only.

8. A selective diffraction grating according to claim 7 in which said predetermined wave length varies along the width of said grating.

9. In a monochromator, in combination, a diffraction grating, a beam of light incident on said grating, an interference wedge disposed substantially perpendicular to said beam and adjacent said grating to cooperate therewith in selecting a wave length range, means for rotating and transversely translating said grating with respect to said beam of light, and means for moving said wedge with respect to said grating while the grating is being rotated and translated, said wedge being of greater length than said grating and moved in the direction of its length at a proportionally greater rate.

10. A monochromator in accordance with claim 6 wherein a mask is provided on the diffraction grating in the path of the light beam which impinges the grating and which varies in width progressively along the length of the grating.

11. A monochromator in accordance with claim 6 wherein a mask is provided on the diffraction grating in the path of the light beam which impinges the grating and which varies in width progressively along the length of the grating, and an auxiliary mask is provided having means to locally reduce a portion of the light beam before it is reflected onto the grating.

12. A monochromator according to claim 6 wherein a mask is provided for the diffraction grating in the path of the light beam which impinges the grating and which is shaped to vary the effective aperture for the light beam.

13. In a monochromator, a beam of light, dispersion means comprising a diffraction grating in the path of said beam, said grating having a grooved surface with working faces, and an interference wedge deposited on said working faces of the diffraction grating and cooperating therewith to produce a single grating spectrum without order overlap.

References Cited
UNITED STATES PATENTS

| | | | |
|---|---|---|---|
| 2,708,389 | 5/1955 | Kavanagh | 88—112 |
| 2,769,111 | 10/1956 | Sadowsky | 88—106 X |
| 3,062,089 | 11/1962 | Martin | 88—14 |
| 3,144,498 | 8/1964 | Alpert et al. | 88—14 |
| 3,216,315 | 11/1965 | Keller | 88—1 X |

FOREIGN PATENTS

| | | |
|---|---|---|
| 861,259 | 2/1961 | Great Britain. |
| 896,934 | 5/1962 | Great Britain. |

JEWELL H. PEDERSEN, *Primary Examiner.*

JOHN K. CORBIN, *Examiner.*